(No Model.)
J. F. GUTHRIE, Jr.
SPRING DIVIDERS.
No. 384,971. Patented June 26, 1888.
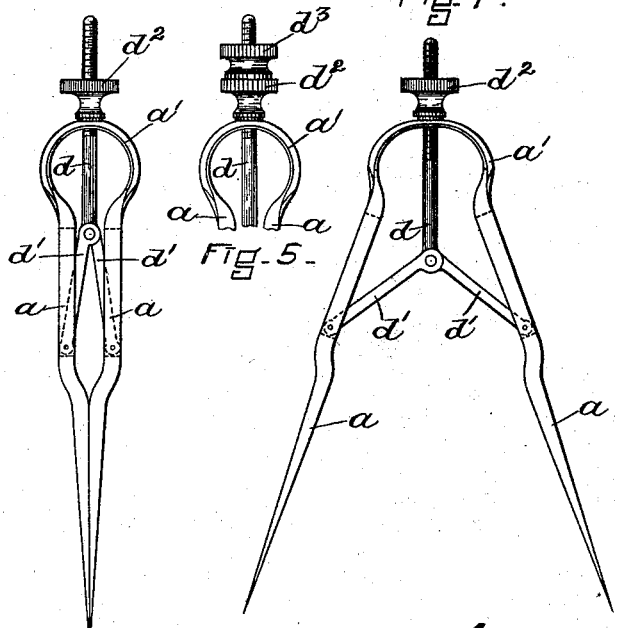

United States Patent Office.

JAMES F. GUTHRIE, JR., OF SOMERVILLE, ASSIGNOR OF ONE-HALF TO THOMAS C. ASHLEY, OF BOSTON, MASSACHUSETTS.

SPRING-DIVIDERS.

SPECIFICATION forming part of Letters Patent No. 384,971, dated June 26, 1888.

Application filed March 8, 1888. Serial No. 266,635. (No model.)

*To all whom it may concern:*

Be it known that I, JAMES F. GUTHRIE, Jr., of Somerville, in the county of Middlesex and State of Massachusetts, have invented a new and useful Improvement in Dividers, of which the following is a specification, reference being had to the accompanying drawings, in which—

Figures 1, 2, and 3 are elevations of a pair of dividers embodying my invention. Fig. 4 is a plan of the dividers shown in Figs. 1, 2, and 3. Fig. 5 shows a portion of my dividers provided with a check-nut.

Dividers and the like embodying my invention are an improvement on the dividers shown in Strange's patent, No. 30,009, dated September 11, 1860, the object of my invention being to produce dividers and the like of this class the legs of which dividers are more readily adjusted in relation to each other than is the case with dividers and the like shown in the patent mentioned.

My invention consists in the combination of a pair of legs which are connected together by a spring, with levers connecting the legs, and provided with a threaded stem extending above the connecting-spring and provided with a nut, as more fully explained herein below.

In the drawings, legs $a$ $a$ are connected by a spring, $a'$, through which projects a threaded stem, $d$, the inner end of which is secured to levers $d'$ $d'$, pinned to legs $a$ $a$, stem $d$ being provided with a nut, $d^2$, and also (preferably) with a check-nut, $d^3$. Legs $a$ $a$ are preferably made, as shown, with longitudinal slots, in which the outer ends of levers $d'$ $d'$ are pinned, and are so shaped that when the legs are closed the ends of the legs come snug together, as shown in Fig. 2.

It will be seen that by turning the nut on stem $d$, and thereby causing the inner end of the stem to move toward the spring, the legs are moved toward each other against the force of the spring, the tension of which keeps the legs at any desired distance from each other, according to the position of the levers and the nut on the stem.

It will be plain to all skilled in the art that the legs of dividers of this class are readily brought into any desired relation to each other by adjustment of the nut on the stem and that the position of the legs in relation to each other is not liable to be accidentally changed.

I disclaim all that is shown in the patent referred to, my invention differing materially from Strange's in that the legs of my dividers are moved toward and away from each other far more readily than is the case in Strange's dividers—that is, in the latter dividers the sliding yoke is moved downward on inclines on the legs against the force of the spring and against the friction of the yoke with the legs, and when these dividers have a very stiff spring it will be seen that the legs must ordinarily be squeezed together preliminary to adjusting the yoke, especially when the legs are to be moved toward each other. In my dividers, however, the legs are always readily movable in either direction by simply turning the nut on the stem.

I am aware of Earle's patent, No. 11,420, dated August, 1854, and disclaim all that is shown in it, my dividers differing radically from Earle's in that the legs of my dividers are held apart and in the position given them by a spring connecting the legs, while the legs of Earle's dividers are connected by a crossbar, to which the legs are jointed, so that when the legs are accidentally moved toward each other they must be moved back by hand and do not spring back automatically, as is the case in my dividers.

What I claim is—

The herein-described combination of legs $a$ $a$, connected together by a spring, $a'$, with levers $d'$ $d'$, pinned to legs $a$ $a$, and connected with a stem, $d$, projecting above the spring $a'$ to receive a nut, all substantially as and for the purpose set forth.

JAMES F. GUTHRIE, JR.

Witnesses:
EDWARD S. BEACH,
JOHN R. SNOW.